United States Patent [19]
Yang

[11] Patent Number: 5,214,342
[45] Date of Patent: May 25, 1993

[54] TWO-DIMENSIONAL WALKER ASSEMBLY FOR A SCANNING TUNNELING MICROSCOPE

[76] Inventor: Kei-Wean C. Yang, 14185 SW. Stirrup St., Beaverton, Oreg. 97005

[21] Appl. No.: 779,653

[22] Filed: Oct. 21, 1991

[51] Int. Cl.$^5$ .......................................... H01L 41/08
[52] U.S. Cl. .................... 310/328
[58] Field of Search ........................ 310/328

[56] References Cited

U.S. PATENT DOCUMENTS

| | | | |
|---|---|---|---|
| 4,798,989 | 1/1989 | Miyazaki et al. | 310/328 |
| 4,877,957 | 10/1989 | Okada et al. | 310/328 |

FOREIGN PATENT DOCUMENTS

| | | | |
|---|---|---|---|
| 0413397 | 2/1991 | European Pat. Off. | 310/328 |
| 1453978 | 10/1976 | United Kingdom | 310/328 |

OTHER PUBLICATIONS

"Compact, high-stability, thimble-size scanning tunneling microscope" by F. Besenbacher, et al. Rev.Sci.Instrum.59(7) Jul. 1988.
"Simple two-dimensional piezoelectric micropositioner for a scanning tunneling microscope" by B. L. Blackford & M. H. Jericho. Rev.Sci.Instrum.61(1), Jan. 1990.
"Piezoelectric Transducer Materials" by H. Jaffe and D. A. Berlincourt, IEEE vol. 53, No. 10, Oct. 1985.
"Scanning tunneling microscopy" by G. Bining & H. Rohrer. IBM J. Res. Develop. vol. 30 No. 4 Jul. 1986.
"Concentric tube scanning tunneling microscope" by C. W. Snyder and A. L. deLozanne. Rev.Sci.Instrum.59(4), Apr. 1988 pp. 541–544.

*Primary Examiner*—Mark O. Budd
*Assistant Examiner*—Thomas M. Dougherty

[57] ABSTRACT

A two-dimensional walker assembly for a scanning tunneling microscope (STM) includes a sample holder upon which a sample to be studied is mounted. A walker has a pair of concentric piezoelectric tubes mounted on a base with corresponding concentric mounting tubes mounted on the ends of the concentric piezoelectric tubes. A magnet is mounted within the inner concentric mounting tube to provide a magnetic force for holding the sample holder on the walker. The sample holder has a corresponding piece of magnetically attractive material contained within. Electrical signals are applied to quadrant electrodes that are coated on the inside of the outer and on the outside of the inner piezoelectric tube in such a manner as to cause the concentric piezoelectric tubes to move in opposition to each other so that the sample holder moves laterally. The electrical signals also provide for extension and retraction of the inner concentric mounting tube relative to the outer concentric mounting tube to impart a lifting movement to the sample holder. The lifting and lateral movements cause the sample holder to be laterally displaced over relatively large distances with respect to a probe tip of the STM.

3 Claims, 2 Drawing Sheets

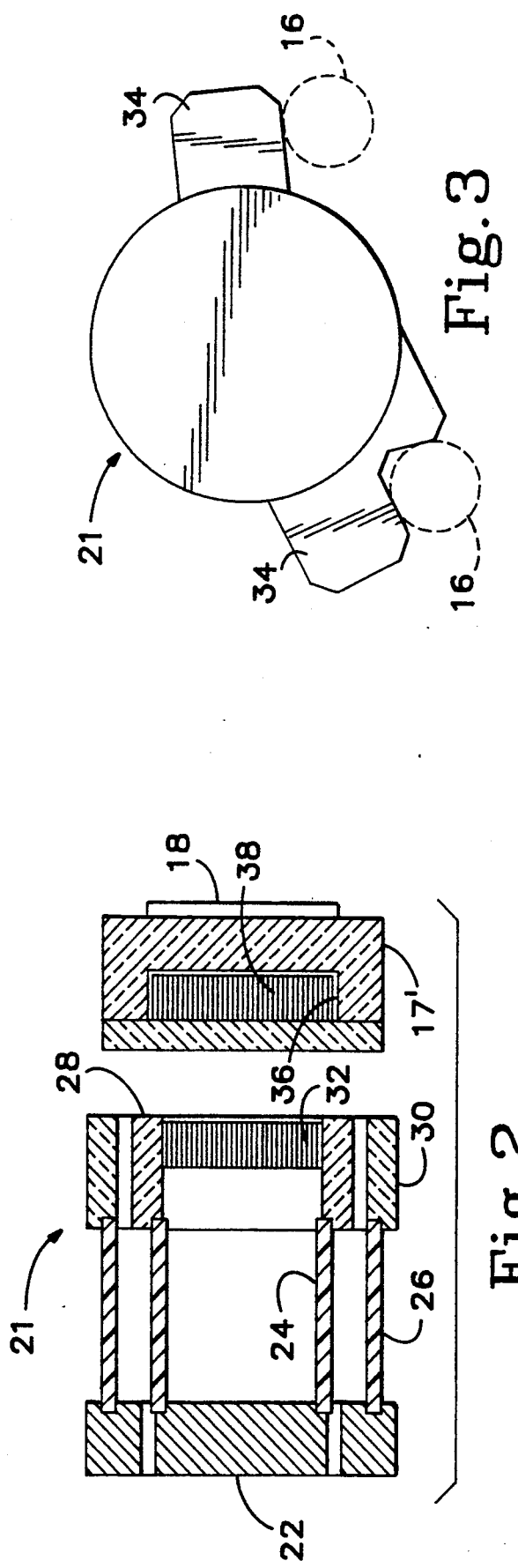

TWO-DIMENSIONAL WALKER ASSEMBLY FOR A SCANNING TUNNELING MICROSCOPE

BACKGROUND OF THE INVENTION

The present invention relates to scanning tunneling microscopy, and more particularly to a two-dimensional walker assembly for coarse positioning of a sample to be scanned with respect to an imaging probe of a scanning tunneling microscope (STM).

In 1986 Binnig and Rohrer of IBM Corporation in Zurich, Switzerland successfully demonstrated scanning tunneling microscopy. Their work is reported in the IBM Journal of Research and Development, Vol. 30 No. 4, July 1986, pages 355-369. In this technique an imaging probe is brought to the surface of a sample under study within 4-8 Angstroms, and a tunneling current is generated between the imaging probe and sample under a relatively low bias voltage. Due to the extremely small spacing control required in designing an STM, management of thermal drift and vibration is of great importance. This task has proven to be very difficult. As a result most of the STM designs support a rather limited lateral travel range for the sample surface with respect to the probe tip. Such an STM is suitable for performing one-dimensional analyses where samples under study have a large homogeneous area. However this restriction makes the STM unsuitable for real device applications because in device analyses the probe tip always needs to travel several millimeters horizontally before being properly positioned.

A common approach to accommodate a large X-Y motion is to make use of miniature X-Y micropositioners. However for a one-inch long linear dimension of the micropositioner, the tip may extend about three thousand Angstroms for a one-degree Centigrade change of temperature due to thermal expansion. Since the spacing needed between the probe tip and the sample surface is on the order of 4-8 Angstroms, this expansion due to temperature variation is unacceptable. As a result in order to make a scan of the sample at different temperatures a long delay is required to assure temperature stability at each measurement temperature. This problem has prevented the two-dimensional STM systems from attaining large X-Y excursions that are desirable for device applications.

As shown in FIG. 1 a current motor design 10 for an STM has a base plate 11, typically of a beryllium-copper composition, upon which are mounted two concentric tubes 12, 13 of piezoelectric material, such as PZT (Pb{Ti,Zr}O$_3$). A probe tip 14 is mounted at the end of the inner PZT tube 12 along the central axis. Via holes are provided through the base plate to allow electrical connections to be made between the PZT tubes and external electrical circuits. The inner PZT tube has an electrode on the outer surface that is segmented into quadrants. The tubes also each have a solid electrode on the interior surfaces. Surrounding the tubes is a cylindrical shield 15 of a material such as brass. Extending from the end of the outer PZT tube are a pair of rails 16, typically quartz rods, upon which a sample holder 17 rests. On the face of the surface holder facing the probe tip is mounted the sample 18 under study. Extending from the end of the shield is a cylindrical viewing tube 19 having an appropriate conductive coating, such as indium-tin-oxide (ITO). An end plate 20 is secured to the base plate by suitable means, such as screws, to hold the entire motor assembly together.

In operation the sample under study is mounted on the face of the sample holder, which in turn is slid onto the rails until it contacts the end of the outer PZT tube that provides Z-translational motion. Current applied to the inner electrodes of the tubes causes the tubes to oppositely expand and contract along the cylindrical axis. Initially the current allows the sample holder to contact the outer tube without contacting the probe tip mounted on the inner tube. Then the currents are adjusted to adjust the Z distance between the probe tip and the sample surface to the desired tunneling distance. Differential currents are applied to opposing outer electrodes of the inner tube to produce appropriate X-Y directional movement of the probe tip with respect to the sample surface to scan the sample. The probe tip motion is limited to about +/−8 micrometers. To scan another portion of the sample surface requires the use of the micropositioners mentioned above for relatively large lateral displacements.

What is desired is a two-dimensional walker assembly for positioning a sample for study over large lateral distances that compensates for temperature drift.

SUMMARY OF THE INVENTION

Accordingly the present invention provides a two-dimensional walker assembly for a scanning tunneling microscope (STM) that produces large X-Y lateral motions for a sample under study. A sample holder is held in place on the walker assembly by means of magnetic force. The sample holder includes a magnetic material and the walker assembly includes a magnet. A pair of concentric PZT tubes mounted on a base plate support corresponding concentric quartz tubes. The PZT tubes are driven to expand/contract differentially to lift the sample holder from the inner quartz tube. The inner PZT is energized to cause the magnet face to move laterally without affecting the sample holder. The inner PZT tube is then caused to move toward the sample holder, and then to move laterally to move the sample holder laterally. This lift and move motion is used to adjust the sample holder laterally so that the probe tip of a scanning tunneling microscope may be located at another point on the sample for imaging.

The objects, advantages and other novel features of the present invention are apparent from the following detailed description when read in conjunction with the appended claims and attached drawing.

BRIEF DESCRIPTION OF THE DRAWING

FIG. 2 is a cross-sectional view of a two-dimensional walker assembly according to the present invention.

FIG. 3 is a front planar view of the two-dimensional walker assembly of FIG. 2.

FIG. 4 is a back planar view of the base of the two-dimensional walker assembly of FIG. 2.

DESCRIPTION OF THE PREFERRED EMBODIMENT

Figure 1:
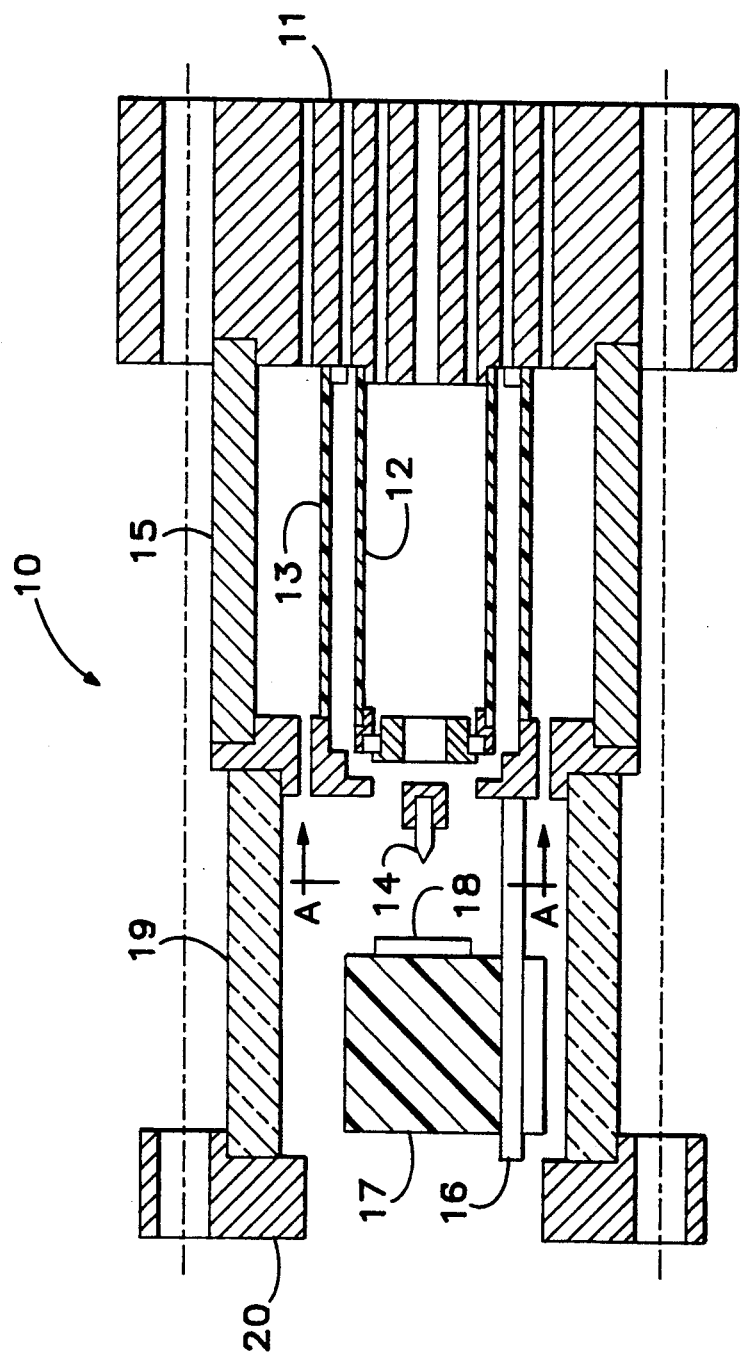
FIG. 1 is a cross-sectional view of a drive motor for a scanning tunneling microscope (STM) according to the prior art.

Referring now to FIGS. 2-4 a walker assembly 21 has a base plate 22 with an electrode pattern. The base plate 22 is of a machinable ceramic material that is rigid and light weight, such as MACOR ceramic material produced by Corning Glass Company of Corning, N.Y.

Mounted concentrically on the base plate 22 are a pair of concentric PZT tubes 24, 26. Quadrant electrodes on the PZT tubes 24, 26 are electrically coupled to the electrode pattern on the base plate 22 by suitable means. A pair of concentric tubes 28, 30, of a material such as quartz, are mounted on the corresponding ends of the PZT tubes 24, 26 opposite from the base plate 22. A magnet 32 is mounted within the inner tube 28 near the surface opposite to the base plate 22. Tabs 34 are attached to or integral with the outer quartz tube 30 so that the walker assembly rests on the guide rails 16 of the Z-translation portion 13 of the STM drive motor 10. Electrically, inner quadrant electrodes 26' of the outer PZT tube 26 are coupled to corresponding opposite outer quadrant electrodes 24' of the inner PZT tube 24 by appropriate electrical runs 27. The electrode configuration shown is preferred, but depending upon the poling direction between the PZT tubes 24, 26 this relationship may be reversed.

A sample holder 17' has a cavity 36 in which a magnetically attractive material 38, such as a nickel-iron alloy, is contained. The sample 18 is mounted conventionally on one face of the sample holder 17'. The other face of the sample holder 17' is adjacent the concentric mounting tubes 28, 30 of the walker assembly 21. The magnetic force between the magnet 32 and the magnetically attractive material 38 keeps the sample holder 17' in place in a vertical position. To avoid possible horizontal restoring of the sample holder 17' by the magnet 32 due to a large horizontal flux gradient between the magnet and the magnetically attractive material 38, the magnetically attractive material has a larger diameter than the magnet so that essentially only vertical lines of flux exist between the magnet and the material. To minimize weight a small, high magnetic density magnet 32 is desired, such as one made from NdFeB.

A low bias potential is applied via the motor base 11 to the probe tip 14. The tunneling current flows from the probe tip 14 to the surface of the sample 18. The return path for the tunneling current from the sample 18 to the motor base 11 may be achieved by coating by appropriate means the sample holder 17', the outer concentric tube 30 including the tabs 34 and the rails 16 with a low resistance conductive material. The tunneling current then flows from the sample 18 to the sample holder 17', then to the outer concentric tube 30 to the rails 16 via the tabs 34, and finally to the motor base 11 along a conductor on the outer PZT tube 13. This eliminates a requirement for connecting an electrical conductor, such as a wire, between the sample 18 and the motor base 11. An appropriate positioner contacts the electrode pattern on the base 22 of the walker assembly 21 to provide the necessary electrical signals to position the sample holder 17' as is described below.

In operation a common mode voltage of one polarity is first applied to both PZT tubes 24, 26 to cause the inner PZT tube to extend while the outer PZT tube contracts. Additional differential signals subsequently are applied to opposing quadrant electrodes on each PZT tube 24, 26 to produce the desired lateral motion of the ends of the mounting tubes 28, 30 supporting the sample holder 17'. Since the outer concentric tube 30 is fixed in position by the tabs 34 on the rails 16, the base 22 is caused to move in one direction by the differential signals. The inner PZT tube 24 is fixed to the base, so that the differential signals cause the inner concentric tube 28 to move in the opposite direction. Thus the curvature imparted to the PZT tubes 24, 26 is the same, causing the sample holder to slide in the desired direction across the stationary end of the outer concentric tube 30. In this manner the end of the inner PZT tube 24 moves in one direction with respect to the end of the outer PZT tube 26. Then when another common mode signal of the opposite polarity is applied, the inner mounting tube 28 is retracted from the sample holder 17' and the differential signals are reversed to move the inner concentric tube 28 to a new pickup position relative to the sample holder 17'. Friction with the surface of the outer mounting tube 30 holds the sample holder 17' in place. Then the inner mounting tube 28 is extended again, lifting the sample holder 17' from the surface of the outer mounting tube 30. The differential signal is reversed again, and the sample holder 17' is moved laterally by the end of the inner mounting tube 28 with respect to the outer mounting tube 30. This lift, slide and drop process is repeated in both the X and Y directions until the sample 18 on the sample holder 17' is in the proper position. Then the Z-translation motor 13 of the STM 10 moves the probe tip 14 to start scanning the new portion of the device 18 under study.

During the sliding portion of the lift, slide and drop action the STM image may still be picked up by the imaging probe 14. This allows tracking of changes in X-Y coordinates so that it is possible to measure the dimension of some very shallow junctions in the sample 18. Also to assure a low thermal drift in the walker assembly 21, all the contacting moving surfaces that determine the sample 18 and probe tip 14 spacing are made of identical low thermal drift material, such as quartz. The tabs 34 contact the rails 16 only at the sample end of the walker assembly 21. The base plate 22 and the piezoelectric tubes 24, 26 do not directly contact any of the moving surfaces. This allows the base plate 22 to move freely according to the thermal changes from the outer piezoelectric tube 26. The inner piezoelectric tube 24 has the same dimensional changes as the outer PZT tube 26, so displacement from the base plate 22 is precisely compensated out to maintain the sample surfaces of the mounting tubes 28, 30 in their original position.

Thus the present invention provides a two-dimensional walker assembly for providing large lateral movements of a sample relative to a probe tip of a scanning tunneling microscope by magnetically mounting a sample holder on the walker assembly, and piezoelectrically lifting and moving the sample holder across the face of the walker assembly to achieve the desired lateral movement.

What is claimed is:

1. A two-dimensional walker assembly for laterally moving a sample with respect to an examination point comprising:
   a sample holder upon which the sample is mounted that contains a block of magnetically attractive material;
   a walker having a pair of concentric tubes, the inner one of the concentric tubes having a magnet mounted therein to secure the sample holder to the walker; and
   means mounted on a base for moving the pair of concentric tubes to lift and laterally move the sample holder.

2. A walker assembly as recited in claim 1 wherein the moving means comprises:

a pair of concentric piezoelectric tubes mounted on the base at one end and having the pair of concentric tubes mounted on the other end; and means for driving the pair of concentric piezoelectric tubes so that the concentric tubes provide a lift and move motion to the sample holder.

3. A two-dimensional walker assembly comprising:

a base:

a pair of concentric piezoelectric tubes mounted on the base;

a pair of concentric mounting tubes mounted on the respective ends of the concentric piezoelectric tubes;

means mounted within the inner one of the pair of concentric mounting tubes for magnetically mounting a sample holder to the two-dimensional walker assembly, the sample holder including a magnetic attractive material; and means coupled to the concentric piezoelectric tubes for separately moving the concentric mounting tubes so that a lifting and a lateral movement motion is imparted to the sample holder.

* * * * *